(12) United States Patent
Helmsen et al.

(10) Patent No.: US 8,834,153 B2
(45) Date of Patent: Sep. 16, 2014

(54) FLAME ARRESTER ARRANGEMENT

(75) Inventors: Frank Helmsen, Peine (DE); Christoph Leinemann, Braunschweig (DE)

(73) Assignee: Protego (U.S.A.), Inc., Charleston, SC (US)

( * ) Notice: Subject to any disclaimer, the term of this patent is extended or adjusted under 35 U.S.C. 154(b) by 1107 days.

(21) Appl. No.: 12/793,765

(22) Filed: Jun. 4, 2010

(65) Prior Publication Data

US 2010/0311001 A1  Dec. 9, 2010

(30) Foreign Application Priority Data

Jun. 9, 2009  (DE) .......... 10 2009 024 814

(51) Int. Cl.
  *F23D 14/16*  (2006.01)
  *A62C 4/02*   (2006.01)
  *B01J 19/00*  (2006.01)

(52) U.S. Cl.
  CPC .......... *A62C 4/02* (2013.01); *B01J 2219/00265* (2013.01); *B01J 19/002* (2013.01)
  USPC ........... 431/350; 431/346; 431/252; 431/202; 169/48

(58) Field of Classification Search
  USPC .............. 431/350, 346, 202, 252; 169/43
  See application file for complete search history.

(56) References Cited

U.S. PATENT DOCUMENTS

| 1,701,805 A | 2/1929 | Dunn et al. |
| 5,415,233 A | 5/1995 | Roussakis et al. |
| 6,699,035 B2 * | 3/2004 | Brooker .......... 431/346 |

FOREIGN PATENT DOCUMENTS

| AT | 250544 | 11/1966 |
| AT | 007 424 | 3/2005 |
| CN | 201101837 | 8/2008 |

* cited by examiner

*Primary Examiner* — Avinash Savani
(74) *Attorney, Agent, or Firm* — Whitham Curtis Christofferson & Cook, PC

(57) ABSTRACT

In a flame arrester arrangement having a housing (1) for holding at least two flame arrester inserts (6, 6') having a large number of axial passage gaps dimensioned for a combustible gas, and having an intermediate layer (7) arranged between two flame arrester inserts (6, 6'), which permits a radial distribution of the gas flow emerging from one flame arrester insert (6, 6') and entering an adjacent downstream flame arrester insert (6, 6'), the ability of the flame arrester inserts (6, 6') to be easily assembled and disassembled for servicing purposes without restricting the functional integrity can be achieved by at least one separate closed seal (11, 11', 15, 17, 17', 20) being arranged between a flame arrester insert (6, 6') and the housing (1) or between two flame arrester inserts (6, 6') in such a way that a flow around the flame arrester insert (6, 6') in a space (12) located radially outside the passage gaps is prevented.

16 Claims, 5 Drawing Sheets

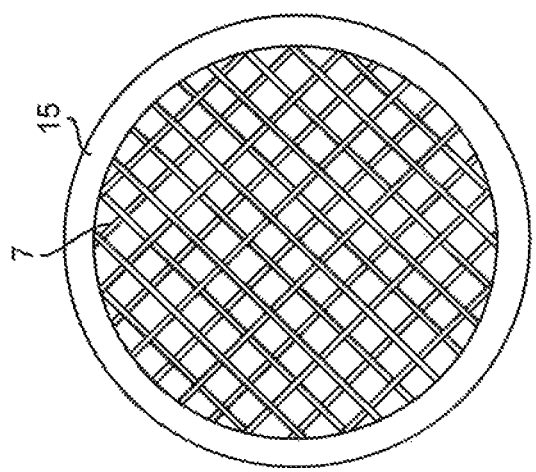
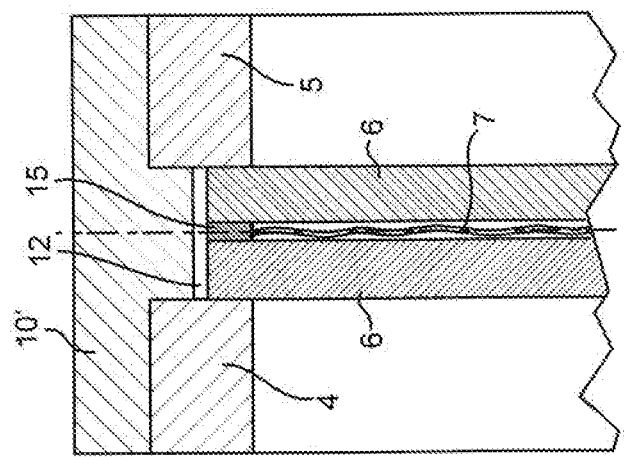

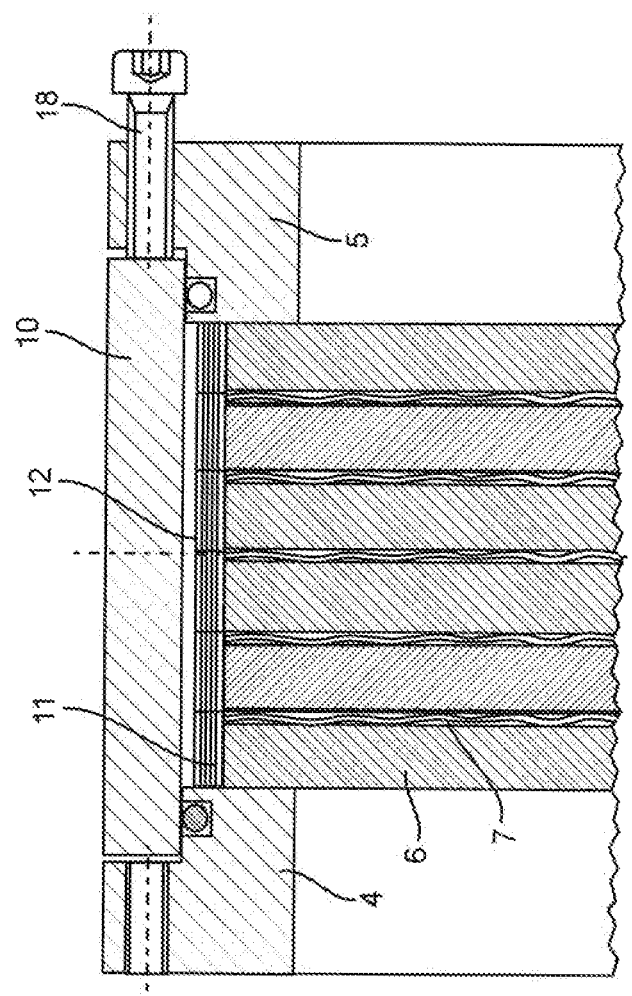

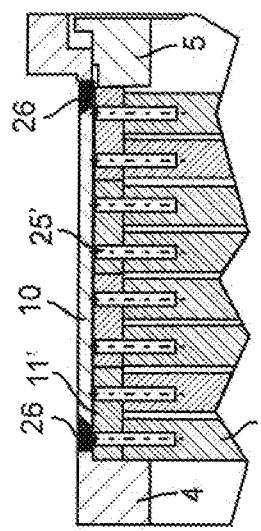
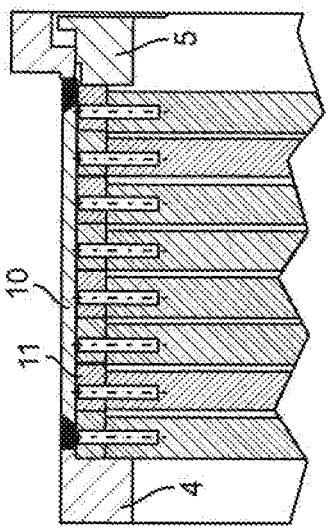
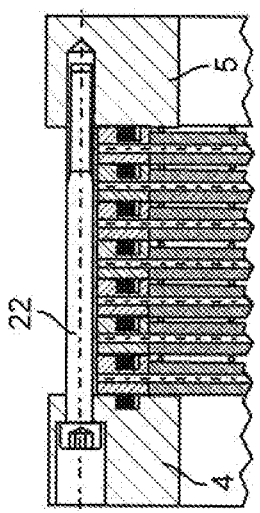
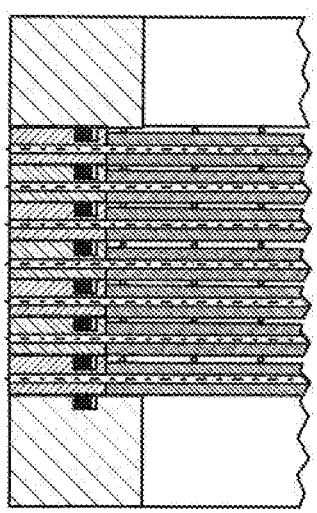
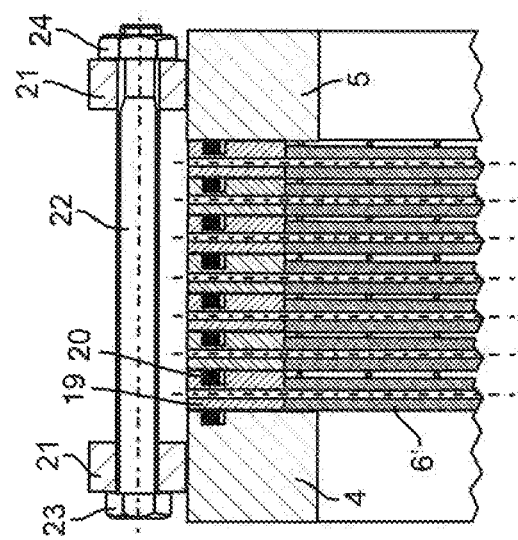

FLAME ARRESTER ARRANGEMENT

FIELD OF THE INVENTION

The invention relates to a flame arrester arrangement having a housing for holding at least two flame arrester inserts having a large number of axial passage gaps dimensioned for a combustible gas, and having an intermediate layer arranged between two flame arrester inserts, which permits a radial distribution of the gas flow emerging from one flame arrester insert and entering an adjacent downstream flame arrester insert.

BACKGROUND

The flame arrester inserts of these flame arrester arrangements are predominantly produced in a winding process using thin stainless steel strips. Here, a smooth metal strip is wound up together with a uniformly corrugated metal strip and the two thus form turns of a preferably disc-like arrangement. The passage gaps result from the corrugated metal strip resting on the two adjacent smooth metal strips, so that defined passage gaps are produced. Depending on the flammability of the gas, the passage gaps, given a predefined axial length, must not exceed a predefined cross-sectional surface area. In order to ensure an adequate flow velocity for easily flammable gases, it may therefore be necessary to wind up the flame arrester inserts with a large cross-sectional surface area, that is to say to produce them with a large winding radius. The turns are preferably arranged such that they lie on one another spirally, but also, in the form of closed circular turns, can each comprise a smooth metal strip and a corrugated metal strip.

It has been found that, given a predefined maximum cross section of the passage gaps, it is expedient to implement the gap length required for the cooling of the gas not with a single flame arrester insert but with a plurality of flame arrester inserts, that is to say at least two, it being advantageous to arrange an intermediate layer between the flame arrester inserts, which permits a radial distribution of the gas flow emerging from the one flame arrester insert and entering the adjacent downstream flame arrester insert.

If the flame arrester inserts are laid directly on one another without an intermediate layer, on the other hand, the passage gaps are not aligned with one another accurately, so that the flame arrester inserts lying on one another form resultant channels of which the effective passage gaps are reduced in size in an undefined way as compared with the passage gaps of a flame arrester insert, since the free cross-sectional surface area of the assembly of flame arrester inserts lying on one another is reduced. As a result, the pressure loss during the flow through is increased sharply. The intermediate layers provided in the flame arrester arrangement of the generic type thus serve as spacer elements, which prevent a reduction in the free cross-sectional surface area of the flame arrester inserts lying one behind another. In a conventional design, the housing of the flame arrester arrangement forms an enclosing cage having a closed shell wall. Since the gas can expand in the radial direction between the flame arrester inserts, care must be taken that the gaps produced between the edge of the flame arrester inserts and the inner wall of the enclosing cage are smaller than the gaps in the flame arrester inserts themselves. Otherwise, there would be a diversionary path around the flame arrester insert, on which the gas is not cooled in the manner provided by the respective flame arrester insert, so that a flashback through the flame arrester arrangement possibly occurs, which means that a catastrophe can be triggered if, for example, an explosion progresses into a gas storage tank which is intended to be protected by the flame arrester arrangement.

In particular during the production of large flame arrester inserts, which can have diameters up to 2 m, it is problematic in fabrication terms to avoid the occurrence of relatively large gaps between the flame arrester insert and the surrounding housing. Such large flame arrester inserts cannot usually be produced to be exactly round. It is therefore known to wind such a flame arrester insert directly in the enclosing cage and, at the points at which relatively large gaps form, then to assemble in smooth filter strip, in order in this way to produce reliable edge contact between the flame arrester insert and the enclosing cage. However, this has the disadvantage that the flame arrester insert is fitted so firmly in the enclosing cage that it cannot be removed in practice for cleaning and renewal purposes, in particular when large amounts of contamination or even corrosion occur/s between the filter and the enclosing cage.

In order to be able to remove a flame arrester insert simply for servicing purposes, a gap that is as large as possible between the flame arrester insert and the enclosing cage is expedient. However, it is necessary to prevent the flame from the gas flow from flowing around one or more flame arrester inserts via the radially outer gap and thus rendering the flame arrester useless.

If at most two flame arrester inserts are used, radially outer supporting rings can bear directly axially on the outside of the flame arrester inserts, so that a radially outer flow around the latter by the gas running through the flame arrester arrangement is not possible. In the case of more than two flame arrester inserts, it is known to use an enclosing cage having stepped walls, in which each flame arrester insert bears in a sealing manner on the metal of the enclosing cage. Such an enclosing cage is very expensive to produce and cannot be mass-produced, since different models and diameters are necessary, depending on the number of flame arrester elements. Furthermore, in order to be suitable for different gases, the flame arrester inserts have to be produced in different sizes.

SUMMARY

The invention is therefore based on the object of designing a flame arrester arrangement of the type mentioned at the beginning in such a way that the assembly and disassembly of the flame arrester inserts is made easier, in particular when three or more flame arrester inserts are used, and an unintended flow around the flame arrester inserts is reliably avoided.

In order to achieve this object, a flame arrester arrangement of the type mentioned at the beginning is characterized in that at least one separate closed seal is arranged between a flame arrester insert and the housing or between two flame arrester inserts in such a way that a flow around the flame arrester insert in a space located radially outside the passage gaps is prevented.

The flame arrester arrangement according to the invention can thus have an arbitrarily large space radially outside the passage gaps of the flame arrester inserts, so that simple assembly and disassembly of the flame arrester inserts is possible.

In the alternative, in which the closed seal is located between the housing and a flame arrester insert, the interspace between the housing and the flame arrester insert for an axial through flow can be closed by the seal. In another, preferred embodiment of the invention, it is however also possible to design the seals provided radially outside the flame arrester inserts to adjoin one another axially without any gaps, so that they are clamped in between axially clamped housing parts and thus effect radial sealing against the flow of the gas out of the intermediate layers. In this case, it is advantageous if the seals are formed by turns of a smooth metal strip wound spirally on one another, so that the seal can be fitted following the production of the flame arrester insert, preferably by the winding technique. In this case, the smooth metal strip used for the production of the seal can have the width of the metal strip of the flame arrester insert or can have a greater width (axial length with respect to the flame arrester arrangement), which corresponds to the joint axial length of flame arrester insert and intermediate layer. If the width of the metal strip for the wound seal is equal to the width of the metal strips for the production of the flame arrester insert, an intermediate ring is expediently inserted in the intermediate layer between the wound seals, so that, in the axial direction, the wound seals and the intermediate rings form a length which corresponds to the length of the flame arrester inserts with their intermediate layers.

In an alternative embodiment, a closed seal can be arranged between the radial edges of the flame arrester inserts, so that sealing radially towards the outside is carried out between the flame arrester inserts. In this case, the intermediate layer is preferably designed to be smaller by the radial width of the closed seal, so that the intermediate layer can be inserted between the flame arrester inserts and the closed sealing ring located between the latter.

An advantageous refinement of the flame arrester arrangement according to the invention is achieved with flame arrester inserts which are provided radially outside the passage gaps with a circumferential solid edge, the edges being clamped as a stack between the housing parts, which are clamped axially against one another. The sealing radially towards the outside is thus carried out by the solid edges of the flame arrester inserts resting on one another and clamped against one another. Annular seals can also be inserted between the edges, and can then make axial clamping of the edges of the flame arrester inserts unnecessary.

If the flame arrester inserts are provided with appropriate solid edges, the provision of a shell-like enclosing housing is rendered superfluous, so that the flame arrester inserts in this case no longer have to be surrounded by an additional lateral housing. As a result, the flame arrester inserts can easily be removed for servicing purposes after only, if appropriate, clamping screws for the axial clamping of housing parts have been loosened or removed.

In other embodiments, the intermediate layer can be formed, for example, by a wire mesh, which merely serves as a spacer between the flame arrester inserts. In order to make assembly easier, the intermediate layers can be joined to an associated flame arrester insert by spot welding, brazing and the like. Likewise, in order to make assembly easier, when intermediate rings are used between the radially outwardly fitted, preferably wound seals of the flame arrester inserts, it is possible to provide a corresponding joint between the intermediate layer and the associated intermediate ring, so that joint handling of the intermediate layer and intermediate ring is possible. Of course, it is also possible to join the intermediate ring to the adjacent seal of the flame arrester insert by welding, brazing and the like.

The present invention is preferably implemented with wound flame arrester inserts. However, it can, of course, also be implemented with all other conventional flame arrester inserts, for example with flame arrester inserts made of sintered metal, metal foams, woven wire meshes, expanded metal meshes, porous ceramics, drilled plates of metal or plastic (in particular PTFE) or the like.

DESCRIPTION OF THE DRAWINGS

The invention will be explained in more detail below by using exemplary embodiments illustrated in the drawings, in which:

FIG. 3 shows a schematic illustration for a flame arrester arrangement having an axial seal running around the edge of the flame arrester inserts FIG. 4 shows a plan view of an intermediate layer in the form of a wire mesh FIG. 9 shows an arrangement, similar to FIG. 1, having a withdrawal device for a housing part in the form of a radially ribbed ring FIG. 10 shows a schematic illustration of an arrangement of seven flame arrester inserts which have a circumferential solid edge FIG. 11 shows variants of the arrangement according to FIG. 10

FIG. 12 shows a welded housing cage having an arrangement having in each case one radial seal for two flame arrester inserts and a modification of the arrangement having in each case one radial seal for one flame arrester insert.

DETAILED DESCRIPTION

Figure 1:
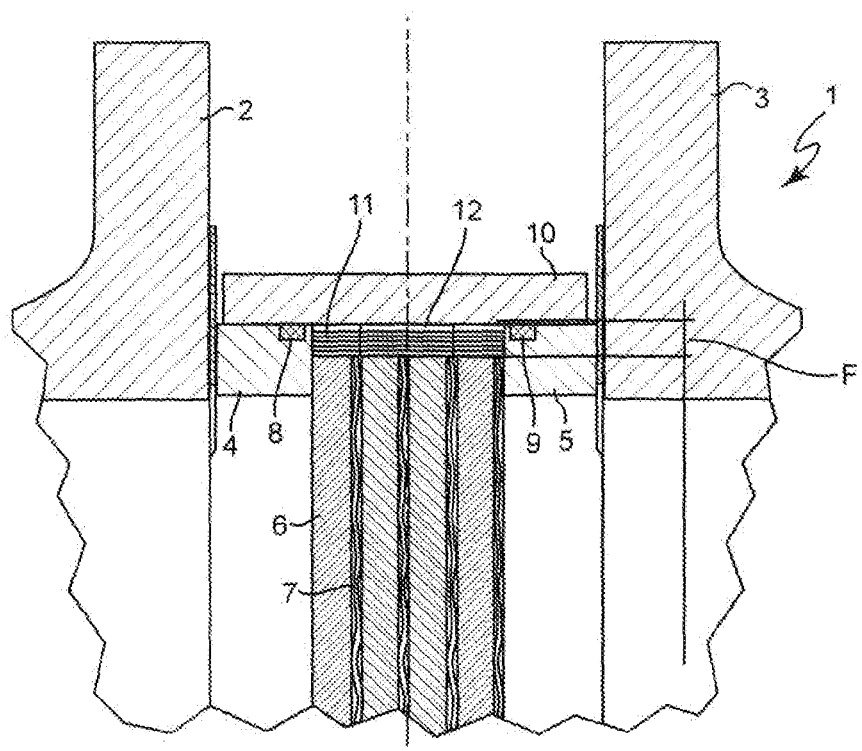
FIG. 1 shows a partial section through a flame arrester arrangement having four flame arrester inserts and four associated radial closed seals

FIG. 1 reveals a housing 1 having two flange-like housing parts 2, 3, which can be clamped axially to each other via clamping screws (not illustrated). The flange-like housing parts 2, 3 act on housing rings 4, joined to them, between which four flame arrester inserts 6 each having an intermediate layer 7 are inserted axially. The housing rings 4, 5 have circumferential grooves 8 on their circumferential surface pointing radially outwards, into which sealing rings 9 in the form of O rings are inserted. Pushed over the housing rings 4, 5 is a cylindrical shell wall 10 which, with the sealing rings 9, seals the space for the flame arrester inserts 6. The flame arrester inserts end radially at a distance from the cylindrical shell wall 10 and, on their outer side, are provided with closed seals 11, the axial length of which corresponds to the sum of the axial lengths of flame arrester insert with associated intermediate layer 7. Via the housing parts 2, 3 and the housing rings 4, 5, the clamping pressure for the axial clamping is exerted on the seals 11 resting on one another, which are thus pressed against one another over their axial lengths and therefore form a radial seal for the intermediate layers 7. The seals 11 are preferably formed by spiral turns of a metal strip with a width equal to the axial length of the seal 11. The wound assembly of turns for the seal 11 is chosen to be sufficiently large that the covering area F, i.e. the radial thickness of the seal 11, is sufficiently large for the seals 11 to be able to absorb the clamping pressure.

It can be seen in FIG. 1 that radially outside the seals 11 there may be a radially outer gap 12 in relation to the cylindrical shell wall, since the sealing in the radial direction is carried out reliably over the axial length of the assembly of flame arrester inserts 6 with the intermediate layers 7.

Figure 2:
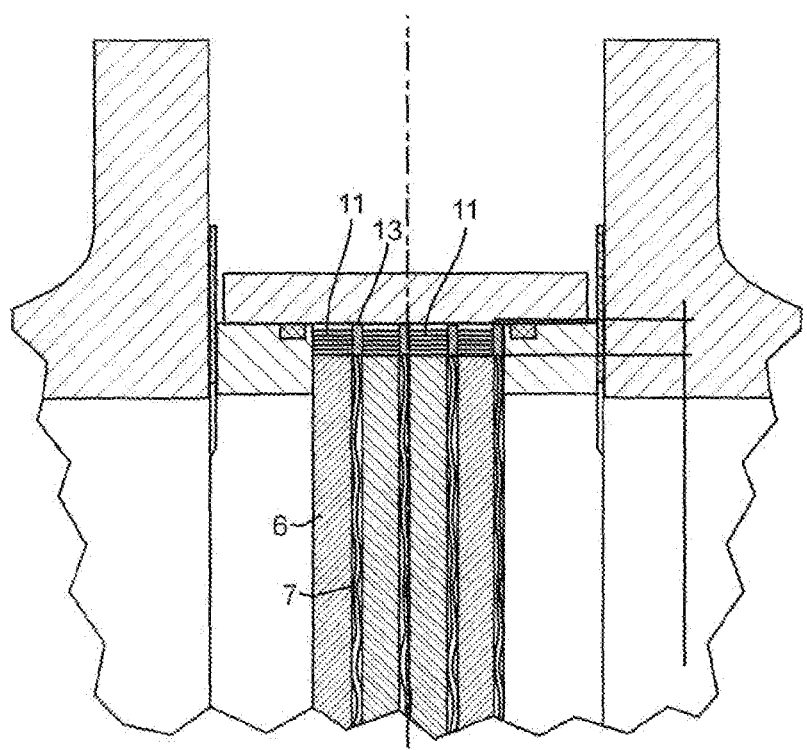
FIG. 2 shows an arrangement analogous to FIG. 1 in which the radially closed seals are combined with intermediate sealing rings

In the embodiment illustrated in FIG. 2, the seals 11 have an axial length which corresponds to the axial length of the flame arrester inserts 6. For the axial length of the intermediate layers 7, intermediate sealing rings 13 are inserted between the seals 11 and ensure that the stack comprising seals 11 and intermediate sealing rings 13 has the same axial length as the flame arrester inserts 6 with the intermediate layers 7.

Figure 2A:
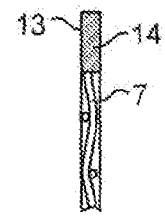
FIGS. 2a and 2b show details of the fixing of the intermediate layers to the intermediate sealing rings

FIG. 2a makes it clear that a welded joint 14 is provided between the intermediate sealing ring 13 and the intermediate layer 7, which is formed as a wire mesh, so that the intermediate layer 7 can be handled together with the intermediate sealing ring 13.

Figure 2B:
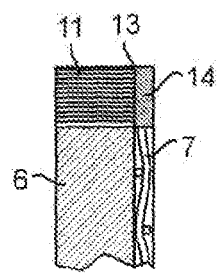

In the variant according to FIG. 2b, welded joints 14 are located both between the intermediate layer 7 and the intermediate sealing ring 13 and between the seal 11 and the intermediate sealing ring 13, so that the flame arrester insert 6 with the intermediate layer 7 joined to it by welded or brazed spots, the seal 11 and the intermediate sealing ring 13 form a component that can be handled as a single unit.

In the variant according to FIG. 3, two flame arrester inserts 6 together with an intermediate layer 7, which is indicated schematically, are clamped in between the housing rings 4, 5, the intermediate layer 7 having a radial extent which is somewhat smaller than the radial extent of the flame arrester inserts 6. In the remaining radial edge region of the flame arrester inserts there is a sealing ring 15 as a flat metallic seal. By means of the pressure exerted by the housing rings 4, 5, the flame arrester inserts 6 and the sealing ring 15 are pressed against one another in a sealing manner, so that no gas can emerge radially outwards from the intermediate layer 7 into the radial gap 12, which is also provided here.

FIG. 4 shows in an elevation the design of the intermediate layer 7, which in this case, in the form of a wire mesh, is joined integrally to the sealing ring 15, for example by welding.

Figure 5:
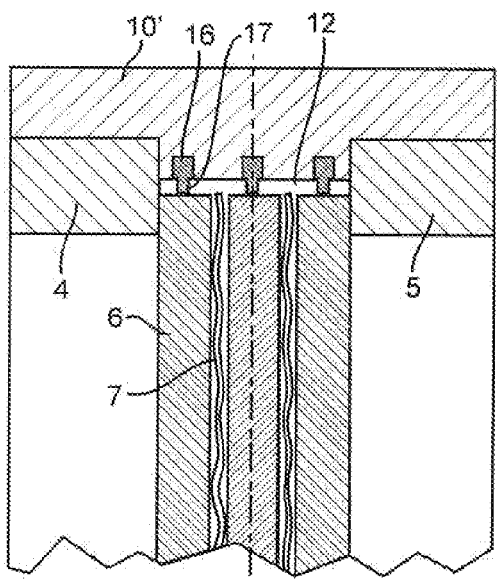
FIG. 5 shows a schematic illustration of a flame arrester arrangement having three radially outer circumferential seals which close an axial flow path through a radially outer gap

In the embodiment illustrated in FIG. 5, three flame arrester inserts 6 having intermediate layers 7 located between them are arranged, and clamped axially, between the housing rings 4, 5. The cylindrical shell wall 10 here has three circumferential grooves 16 on its inside, into which there are inserted sealing rings 17, which close the radially outer gap 12 in the axial direction for a flow through. Accordingly, although gas from the intermediate layer can enter the radially outer gap, it cannot flow externally around any of the flame arrester inserts 6, since the axial passage is blocked by the sealing rings 17.

Figure 6:
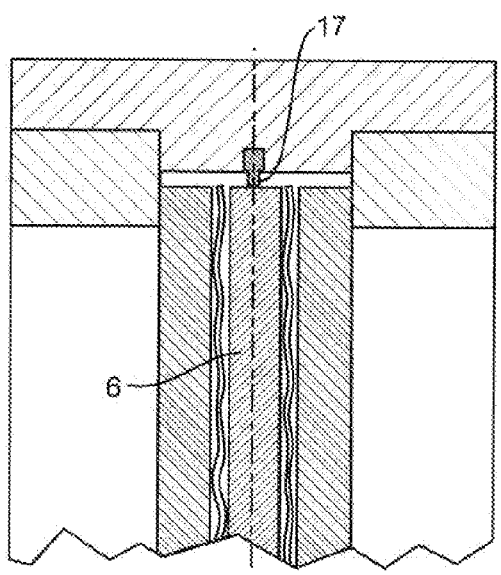
FIG. 6 shows an arrangement according to FIG. 5 having a single radial seal on the central flame arrester insert

FIG. 6 shows a similar arrangement, in which only the central flame arrester insert 6 is sealed radially to the outside by a sealing ring 17. This is sufficient if the housing rings 4, 5 rest in a sealing manner on the radial edges of the outer flame arrester inserts 6, so that flow around the outer flame arrester inserts 6 is already impossible as a result of the clamping of the outer flame arrester inserts 6. The sealing ring 17 therefore serves to prevent the flow around the central flame arrester insert 6.

Figure 7:
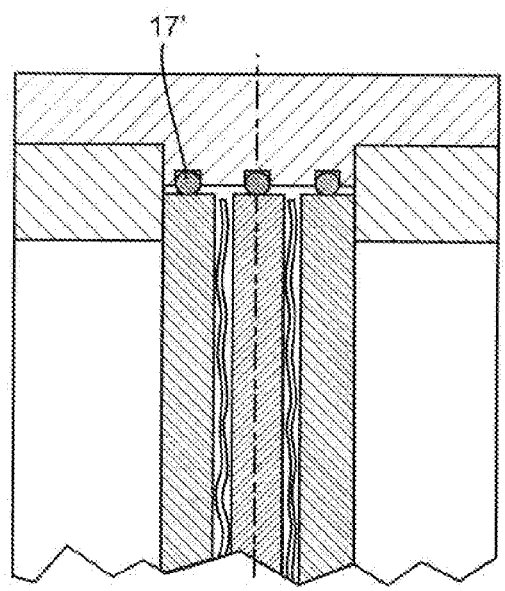
FIG. 7 shows an arrangement according to FIG. 5 having another embodiment of the radial seal
Figure 8:
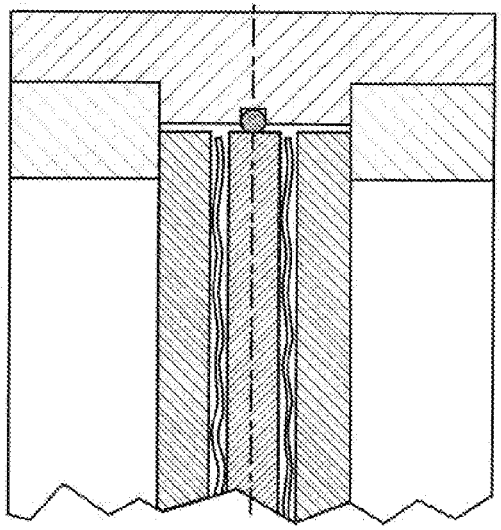
FIG. 8 shows an arrangement according to FIG. 6 having another embodiment of the radial seal

FIG. 7 shows an arrangement similar to FIG. 5, in which the sealing rings 17' are implemented not as flat sealing rings but as sealing rings having a circular cross section in the manner of an O ring. A corresponding modification to the embodiment according to FIG. 6 it can be found in FIG. 8. In some cases, it will be possible to form the sealing rings 17, 17' from thermally stable plastic or elastomer. However, preference is given to the formation of the sealing rings 17, 17' from a soft metal, for example soft copper.

The embodiment of a flame arrester arrangement illustrated in FIG. 9 provides for a threaded bolt 18 to be screwed into the housing ring 5, the bolt having its blunt end supported on one end of the cylindrical shell wall 10. The housing ring 5 preferably has a plurality of such threaded bolts 16, which make disassembly of the flame arrester arrangement easier. This is because, by virtue of the threaded bolt 18 being screwed in, the housing ring 5 can be drawn off the cylindrical shell wall 10 by screwing, by which means the access to the arrangement comprising the flame arrester inserts 6, the intermediate layers 7 and the seals 11 is freed. Since the outer radial gap 12 in relation to the cylindrical shell wall is provided, the flame arrester inserts 6 with the intermediate layers 7 and the seals 11 can be removed singly or jointly in a straightforward manner and cleaned or replaced for servicing purposes.

The flame arrester inserts 6 illustrated in the exemplary embodiments up to this point comprise spiral or concentric turns resting on one another, which each comprise a smooth metal strip and a corrugated metal strip. The corrugated metal strip here is preferably implemented with corrugations which are inclined with respect to the longitudinal direction of the strip. The oppositely directed running hatchings in the drawings here express the fact that, in order to even out the flow through the flame arrester inserts 6, flame arrester inserts wound in different directions adjoin one another, so that the gas flows through the assembly of flame arrester inserts in the manner of a zigzag course, since the passage gaps caused by the corrugated strip run in different inclined directions.

In the exemplary embodiment illustrated in FIG. 10, the flame arrester inserts 6' are provided with a circumferential solid edge 19 which, on one side, has a circumferential open groove to accommodate a seal 20. In this embodiment, the housing rings 4, 5 are provided with attachments 21 which have openings for a clamping screw 22 to be led through. The clamping bolt 22 rests on one of the attachments 21 with a screw head 23 and on the other of the attachments 21 with a nut 24 surrounding the screw, so that, by means of a plurality of such clamping screws 22 distributed over the circumference, the housing rings 4, 5 are pulled axially towards each other and clamp in between them the stack formed from the flame arrester inserts 6'.

In the embodiment according to FIG. 10, each of the flame arrester inserts 6' is stabilized by a bolt bored radially through them. Such stabilization of flame arrester inserts 6' is known in principle for large wound flame arrester inserts 6'.

FIG. 11 shows two variants of the embodiment of the clamping screw 22 in conjunction with the housing rings 4, 5 in order to carry out the axial clamping.

In the variant according to FIG. 11b, the clamping screw extends through passage holes in the solid edges 19 of the flame arrester inserts 6', which ensures additional alignment of the flame arrester inserts 6'.

In the embodiments of FIG. 12, eight flame arrester inserts 6 are provided, which are arranged between housing rings 4, 5. In this embodiment, the cylindrical shell wall 10 is joined to the housing 1 by weld seams 26.

The seals 11' according to FIG. 12a are designed with an axial length which corresponds to the sum of the axial lengths of two flame arrester inserts 6 and two intermediate layers 7.

For the eight flame arrester inserts 6 with the eight intermediate layers 7, four closed seals 11' are thus used, and these are clamped in between the housing rings 4, 5. In order to join the seals 11' to the flame arrester inserts 6, radial bolt sections 25' are introduced, this preferably being done by spark erosion, while maintaining the defined passage gaps of the flame arrester inserts 6. As distinct from the bolts 25 according to FIG. 10, the bolt sections 25' extend only over a radial sub-region, while the bolts 25 extend over the entire diameter of the flame arrester insert 6'.

FIG. 12b makes it clear that the stabilization with the bolt sections 25' is of course also possible when, as in FIG. 1, the seals 11 have the axial length of only one flame arrester insert 6 with the associated intermediate layer 7.

From the descriptions of the exemplary embodiments, it can readily be seen that, within the context of the claimed invention, further different designs are possible. For instance, it is also possible to use cylindrical shell walls 10 or housing rings 4, 5 having stepped wall regions, which permit a stepped arrangement of flame arrester inserts 6 of different sizes. However, preference is given to the use of flame arrester inserts 6 of equal size, in order to avoid the disadvantages of increased outlay for the fabrication of the housing and the clamping of the stack of flame arrester inserts 6.

The invention claimed is:

1. Flame arrester arrangement, comprising:
a housing:
at least two flame arrester inserts, each having a large number of axial passage gaps dimensioned for a combustible gas, wherein each of said at least two flame arrester inserts is sized to form a space radially outside each of the at least two flame arrester inserts which facilitates disassembly of the at least two flame arrester inserts;
an intermediate layer arranged between said at least two flame arrester inserts which permits a radial distribution of gas flow emerging from one flame arrester insert of said at least two flame arrester inserts and entering an adjacent downstream flame arrester insert of said at least two flame arrester inserts; and
at least one separate closed seal arranged between
at least one flame arrester insert of said at least two flame arrester inserts and the housing,
or between
said at least two flame arrester inserts,
in such a way that a flow around the at least two flame arrester inserts in said space radially outside each of the at least two flame arrester inserts is prevented,
wherein said housing has at least two housing parts which are clamped axially against one another, and wherein said at least two flame arrester inserts are located between said at least two housing parts,
wherein each of said at least two flame arrester inserts includes a circumferential solid edge, and wherein the circumferential solid edge of each of said at least two flame arrester inserts are clamped as a stack between the housing parts, and
wherein the at least one separate closed seal includes a plurality of annular seals and the annular seals are inserted between the edges.

2. Flame arrester arrangement according to claim 1, wherein the at least two flame arrester inserts are each of disc-like design with equal cross sections.

3. Flame arrester arrangement according to claim 1, wherein the at least two flame arrester inserts comprises at least three flame arrester inserts.

4. Flame arrester arrangement according to claim 1, wherein the at least one separate closed seal is formed radially outside at least one flame arrester insert of said at least two flame arrester inserts.

5. Flame arrester arrangement according to claim 4, wherein the at least one separate closed seal is formed by turns of a smooth metal strip wound spirally on one another.

6. Flame arrester arrangement according to claim 4, wherein the at least one separate closed seal includes a plurality of separate closed seals, and wherein each flame arrester insert of said at least two flame arrester inserts has at least one separate closed seal of said plurality of separate closed seals positioned radially on an outside surface.

7. Flame arrester arrangement according to claim 4, wherein the at least one separate closed seal has an axial length which corresponds to an axial length of one flame arrester insert of said at least two flame arrester inserts plus an axial length of the intermediate layer.

8. Flame arrester arrangement according to claim 4, wherein the at least one separate closed seal includes at least two separate closed seals each associated with one of said at least two flame arrester inserts and each having an axial length which corresponds to an axial length of one flame arrester insert of said at least two flame arrester inserts, and further comprising
a closed intermediate sealing ring of a length equal to an axial length of the intermediate layer, wherein said closed intermediate sealing ring is arranged between the two separate closed seals of the at least two flame arrester inserts.

9. Flame arrester arrangement according to claim 1, wherein the at least one separate closed seal is arranged between the housing parts clamped axially to one another and is configured to absorb clamping pressure of the housing parts.

10. Flame arrester arrangement according to claim 1, wherein said space radially outside each of the at least two flame arrester inserts creates a circumferential gap in relation to a shell wall of the housing.

11. Flame arrester arrangement according to claim 10, wherein the at least one separate closed seal closes the circumferential gap between at least one flame arrester insert of said at least two flame arrester inserts or said intermediate layer and the housing.

12. Flame arrester arrangement according to claim 1, wherein the at least one separate closed seal is arranged at a radial edge between said at least two flame arrester inserts.

13. Flame arrester arrangement according to claim 12, wherein the intermediate layer is smaller in thickness said at least one separate closed seal.

14. Flame arrester arrangement according to claim 1, wherein each of the at least two flame arrester inserts have a circular cross section.

15. Flame arrester arrangement according to claim 1, wherein the axial passage gaps of each of the at least two flame arrester inserts are formed by turns resting on one another, which jointly comprise a smooth metal strip and a corrugated metal strip.

16. Flame arrester arrangement according to claim 6, wherein the plurality of separate closed seals are arranged between housing parts of said housing which are clamped axially to one another and wherein the plurality of separate closed seals absorb clamping pressure of the housing parts.

* * * * *